United States Patent
Riedle et al.

(10) Patent No.: US 6,701,246 B2
(45) Date of Patent: Mar. 2, 2004

(54) ENGINE TORQUE DETERMINATION FOR POWERTRAIN WITH TORQUE CONVERTER

(75) Inventors: Bradley Dean Riedle, Northville, MI (US); David Karl Bidner, Livonia, MI (US); Jeffrey Allen Doering, Canton, MI (US); Vincent John Winstead, Madison, WI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 09/682,948

(22) Filed: Nov. 2, 2001

(65) Prior Publication Data

US 2003/0097215 A1 May 22, 2003

(51) Int. Cl.[7] .............................................. F02D 45/00
(52) U.S. Cl. ....................... 701/110; 123/352
(58) Field of Search .......................... 701/110; 123/352; 477/54

(56) References Cited

U.S. PATENT DOCUMENTS

| | | | |
|---|---|---|---|
| 5,184,527 A | * | 2/1993 | Nakamura .................. 477/110 |
| 5,752,485 A | | 5/1998 | Minowa et al. |
| 6,095,117 A | | 8/2000 | Minowa et al. |
| 6,434,472 B1 | * | 8/2002 | Minowa et al. ............. 701/110 |

* cited by examiner

Primary Examiner—Andrew M. Dolinar
(74) Attorney, Agent, or Firm—Allan J. Lippa; Kolisch Hartwell, P.C.

(57) ABSTRACT

A system and method for controlling a multiple cylinder internal combustion engine include determining a driver-demanded torque, determining a first torque based on the driver-demanded torque and a torque converter model, and determining a second torque based on an engine speed error between a current and target engine speed multiplied by a calibratable gain factor based on the speed ratio of the torque converter. The engine is then controlled to deliver the sum of the first and second engine torques to improve system response to part-throttle acceleration requests, particularly for vehicle launch and drive away.

30 Claims, 2 Drawing Sheets

ENGINE TORQUE DETERMINATION FOR POWERTRAIN WITH TORQUE CONVERTER

BACKGROUND OF INVENTION

1. Field of the Invention

The present invention relates to a system and method for determining desired engine torque for a powertrain having a transmission with a torque converter.

2. Background Art

Internal combustion engines having electronic throttle control (ETC) typically determine a driver-demanded torque based (at least in part) on accelerator pedal position. The driver-demanded torque is typically interpreted as the wheel torque or net torque available to the system to accelerate the vehicle. However, the engine controller can only influence the combustion or indicated torque produced by the engine by controlling the throttle valve position, ignition timing, and fuel injection timing and quantity. To provide the desired output shaft or wheel torque, the indicated or combustion torque produced by the engine must take into account any torque multiplication or reduction provided by the drivetrain, in addition to various losses and engine/vehicle accessory loads. For automatic transmission applications, the torque converter multiplication should be considered. However, the inventors herein have recognized that torque multiplication of the torque converter is dependent upon a variety of operating parameters of the engine and transmission and may be difficult to determine precisely, particularly during transient conditions, using prior art strategies.

One prior art strategy uses a well-known torque converter relationship between torque ratio and speed ratio to calculate the desired engine combustion torque (or torque converter impeller torque) based on a desired wheel torque and corresponding torque converter turbine torque. This strategy essentially iteratively solves the torque converter equations, which may result in a slow or sluggish response to a driver demand for an increase in output shaft or wheel torque for moderate acceleration, particularly when a vehicle is driving away from a full stop. In addition, this strategy may not adequately account for inertia-based torque loads which occur during transient operation resulting in a sluggish response and poor drivability.

SUMMARY OF INVENTION

An object of the present invention is to provide a system and method for determining a desired engine torque during unlocked torque converter operation from a desired turbine torque to improve the response to an increase in driver-demanded output shaft or wheel torque.

In carrying out the above object and other objects, features and advantages of the present invention, a system and method for controlling a multiple cylinder internal combustion engine include determining a driver-demanded torque, determining a target engine speed to deliver a desired torque converter turbine torque corresponding to the driver-demanded torque based on a torque converter model, determining a first engine torque based on the target engine speed, determining a second engine torque to accelerate the engine speed from a current speed to the target engine speed, and controlling the engine to deliver the sum of the first and second engine torques.

In another embodiment of the invention, a system and method for controlling a multiple cylinder internal combustion engine coupled to a transmission via a torque converter having a torque converter impeller selectively fluidly coupled to a torque converter turbine include determining a driver-demanded torque, determining a first engine torque based on the driver-demanded torque and a steady-state model of the torque converter, determining a second engine torque based on a current engine speed and a target engine speed, wherein the second engine torque is based on a speed ratio of turbine speed and impeller speed, and controlling the engine to deliver the sum of the first and second engine torques.

The present invention provides a number of advantages. For example, the present invention accounts for inertia-based torque loads that occur during transient operation to provide a more responsive control for part-throttle accelerations, particularly for vehicle launch, i.e., when driving away from a complete stop. In addition, the present invention provides desirable drivability in a full authority electronic throttle control (ETC) system. As known, full authority ETC systems may result in reduced losses and increased fuel economy as compared to mechanical throttle and pedal follower systems.

The above advantages and other advantages, objects and features of the present invention will be readily apparent from the following detailed description of the best mode for carrying out the invention when taken in connection with the accompanying drawings.

DETAILED DESCRIPTION

Figure 1:
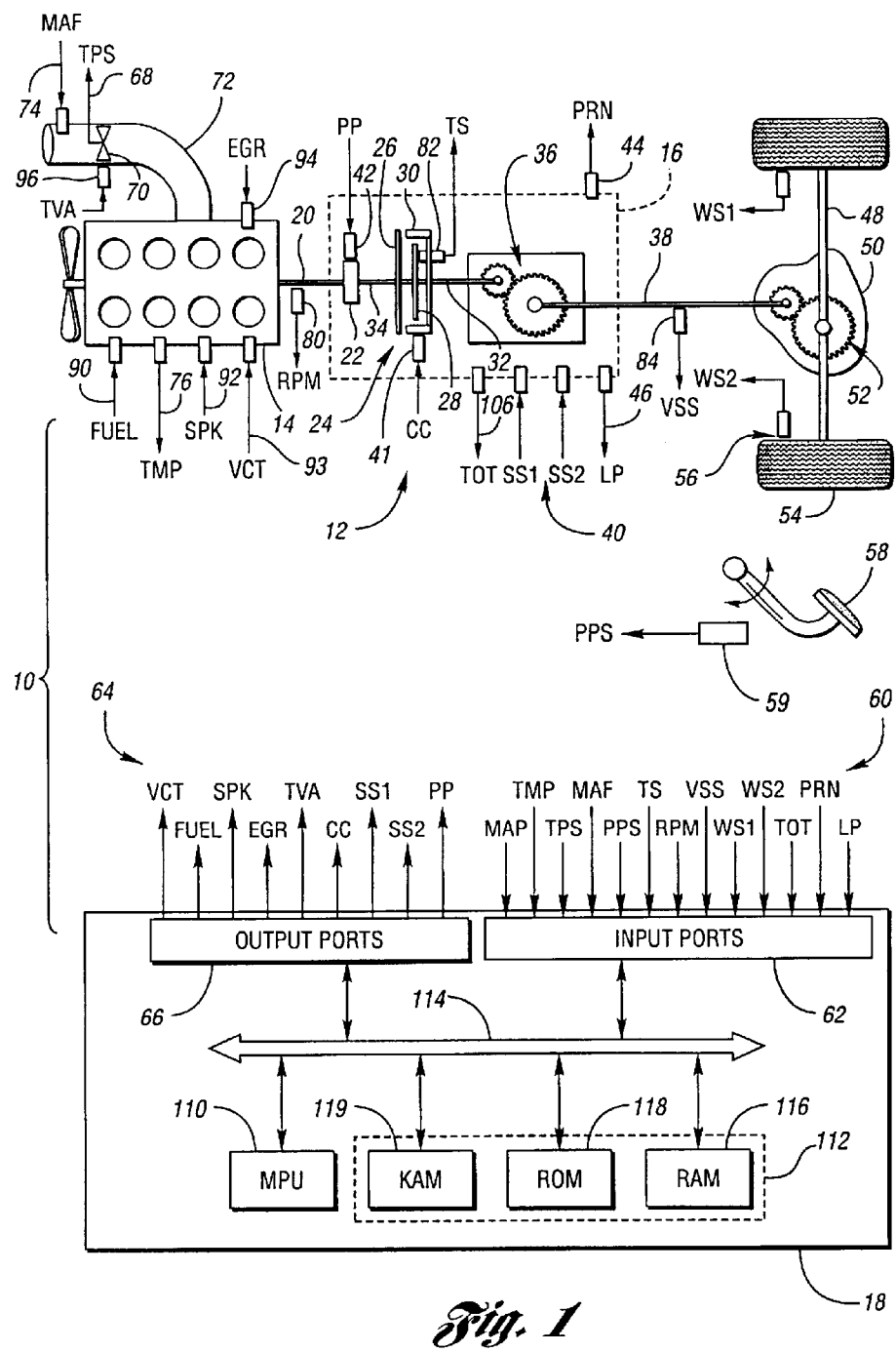
FIG. 1 is a block diagram illustrating a representative system for determining engine torque according to one embodiment of the present invention.

FIG. 1 is a block diagram illustrating a system and method for controlling a multiple cylinder internal combustion engine according to one embodiment of the present invention. System 10 includes a vehicular powertrain 12 having an internal combustion engine 14 coupled to an automatic transmission 16. Although the present invention is described with reference to a gear change transmission, one of ordinary skill in the art will recognize that the present invention is equally applicable to any transmission having a torque converter, which may include speed change transmissions and continuously variable transmissions (CVT), for example. Powertrain 12 preferably includes an integrated powertrain controller 18 in communication with engine 14 and transmission 16 for providing various information and control functions. Depending the particular application, stand-alone engine and transmission controllers may also be used as will be appreciated by those of ordinary skill in the art. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

In one embodiment, automatic transmission 16 includes a plurality of input-to-output ratios or gear ratios effected by various gears, indicated generally by reference numeral 36, and associated frictional elements such as clutches, bands, and the like, as well known in the art. Gears 36 provide selective reduction or multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicates with controller 18 via output ports 66 to effect control of powertrain 12 in response to commands generated by controller 18.

The sensors preferably include a throttle valve position sensor (TPS) 68 which monitors the position of throttle valve 70 which is disposed within intake 72. A mass airflow sensor (MAF) 74 provides an indication of the air mass flowing through intake 72. A temperature sensor (TMP) 76 provides an indication of the engine temperature which may include engine coolant temperature or engine oil temperature, for example.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, output shaft speed sensor (OSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to request a driver-demanded output shaft torque or wheel torque that is used to control the output of powertrain 12. A pedal position sensor 59 provides an indication of the position of accelerator pedal 58, preferably in the form of counts. In one embodiment, an increasing number of counts indicates a request for increased power output. Preferably, redundant position sensors are used with at least one position sensor having a negative slope such that a decreasing number of counts corresponds to a request for increased power output. A manifold absolute pressure (MAP) sensor, or equivalent, may be used to provide an indication of the current barometric pressure.

Actuators 64 are used to provide control signals or to effect movement of various devices in powertrain 12. Actuators 64 may include actuators for timing and metering fuel (FUEL) 90, controlling ignition angle or timing (SPK) 92, controlling intake/exhaust valve actuators 93 (VCT) to implement variable cam timing, setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented using separate engine and transmission controllers depending upon the particular application as described above. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 119. These "functional" descriptions of the various types of volatile and nonvolatile storage may be implemented by any of a number of known physical devices including but not limited to EPROMs, EEPROMs, PROMs, flash memory, and the like. Computer readable media 112 include stored data representing instructions executable by microprocessor 110 to implement the method for controlling engine torque according to the present invention.

In operation, torque is applied through engine 14 through crankshaft 20 to impeller 26 of torque converter 24. Torque is transferred through the transmission fluid to turbine 28 which in turn causes driveshaft 38 to rotate based on the selected gear ratio of gearbox 36. Unlike the prior art approach which uses steady-state derived equations to model the static and dynamic torque converter characteristics, the present invention provides transient equations which take into account accelerated inertia-based torque loads which occur during rotational speed changes of engine and transmission components.

Beginning with a known steady-state modeling approach for the torque converter:

$$I_e \dot{N}_e(t) = T_{net}(t) - T_i(t)$$

where $I_e$ represents rotating inertia of the engine, flywheel, and torque converter elements, including approximately one-third of the converter fluid rotating with the impeller, $$\dot{N}_e$$

represents engine acceleration, $T_{net}(t)$ is the net engine output torque (indicated torque less friction, pumping, accessories and transmission pump losses), and $T_i(t)$ is the reaction torque from the torque converter impeller. As also known, the impeller torque can be generally described as a function of impeller speed and the speed ratio across the torque converter as follows:

$$T_i = f_i\left(\frac{N_t}{N_e}, N_e\right)N_e^2$$

where $T_i$ is the impeller torque, $N_e$ is the engine speed, $$\frac{N_t}{N_e}$$

is the speed ratio across the torque converter, with the typical torque converter torque multiplication equation (as a function of speed ratio only) expanded as shown in the equation below, where $T_t$ represents torque at the turbine, after the torque converter.

$$T_t = f_{TR}\left(\frac{N_t}{N_e}, N_e\right)T_i$$

Combining the above equations provides:

$$T_t = f_{TR}\left(\frac{N_t}{N_e}, N_e\right) \times f_i\left(\frac{N_t}{N_e}, N_e\right)N_e^2$$

From the previous equation, it is clear that to achieve a certain turbine torque at a given turbine speed, there is a required engine/impeller speed. The first equation shows that any additional torque from the engine in excess of the impeller torque will result in engine and impeller acceleration, not additional turbine torque. The time period between an increase in requested wheel torque (translated to turbine torque) and the realization that torque increase will be a function of the engine speed trajectory. The first equation can be rearranged to determine impeller input torque, showing that the acceleration of the engine and impeller uses torque that otherwise would be transferred to the wheels, as follows: speed corresponding to when the torque converter reaches equilibrium. Because the turbine speed and desired turbine torque may be changing on a continuous basis, the present invention was designed to accommodate moving targets. Starting from a torque converter mapping of engine/impeller speed to produce a desired turbine torque as represented by the function $F_{Ne}$ in the equation above, a desired engine acceleration $$(\dot{N}_e(t)^{desired})$$

is determined based on the current engine speed error $$(N_e^{target} - N_e)$$

as represented by:

$$\dot{N}_e(t)^{desired} = ne\_dot\_mult \times (N_e^{target} - N_e)$$

where ne_dot_mult is a calibratable gain factor. The goal of this embodiment of the control algorithm is to determine a desired $T_{net}$, which can be expressed by:

$$T_{net}^{desired}(t) = I_e \dot{N}_e(t)^{desired} + T_i(t+\Delta t)$$

where $T_i(t+\Delta t)$ is the impeller torque at some time in the future due to the desired change in engine speed that results in a change in impeller torque as determined according to the equation below. The desired engine acceleration is preferably used in the previous equation rather than the actual engine acceleration because using the actual engine acceleration would produce a positive feedback loop and reduce the proactive nature of this approach. The desired engine acceleration can also be used to predict engine speed at some future time. This is advantageous in that waiting for the actual engine acceleration would result in a delay in this component of the torque calculation.

The impeller torque at some future time may be represented by:

$$T_i(t+\Delta t) = f_i\left(\frac{N_t}{N_e(t+\Delta t)}, N_e(t+\Delta t)\right)(N_e(t+\Delta t))^2$$

$$N_e(t+\Delta t) = N_e(t) + \Delta t \dot{N}_e(t)^{desired}$$

The term $\Delta t$ accounts for the expected delay from desired acceleration to actual acceleration of the engine. If the only cause of this delay is the delay from charge induction to cylinder power events, $\Delta t$ can be set to one engine revolution. However, the value for $\Delta t$ may be greater than one engine revolution for many applications.

The future engine speed used for the impeller load torque calculations (represented by $N_e(t+\Delta t)$), may be calculated in various ways depending upon the particular application. This future engine speed may be calculated by predicting engine speed one revolution into the future, as shown in the previous equation, may be set to the target engine speed (represented by $$N_e^{target}$$

as calculated as indicated above, or may be determined using the current engine speed, which is equivalent to setting $\Delta t=0$. The second and third options may be easier to implement between stand-alone engine and transmission controllers because the current engine speed is directly measurable and the target engine speed can be calculated from desired turbine torque and torque converter characteristics. Once the desired engine indicated or combustion torque represented by $$T_i^{desired}$$

has been determined from the above equations, the engine controller controls various actuators 64 to produce the desired torque.

The representative control algorithm according to the present invention as described above was implemented in C-code and tested using a vehicle powertrain simulator. The torque converter characteristics used in the equations were simplified by assuming brake torque ($N_t=0$) conditions only (both $T_t$ and $T_i$ reduce to linear functions of $$N_e^2).$$

Using a two degree accelerator pedal step input, the proportional gain, or trajectory shaping parameter ne_dot_mult was adjusted to achieve a desired response to a throttle step command. Depending upon the particular application, representative values for the proportional gain ne_dot_ mult may be between 3–7, for example. To evaluate the performance of a representative embodiment of the present invention under normal launch and drive-away conditions, simulation data was used to develop a set of equations that approximate the relationships for turbine torque and impeller torque used in the equations. This simulation demonstrated improved performance of the present invention under different tip-in conditions.

Figure 2:
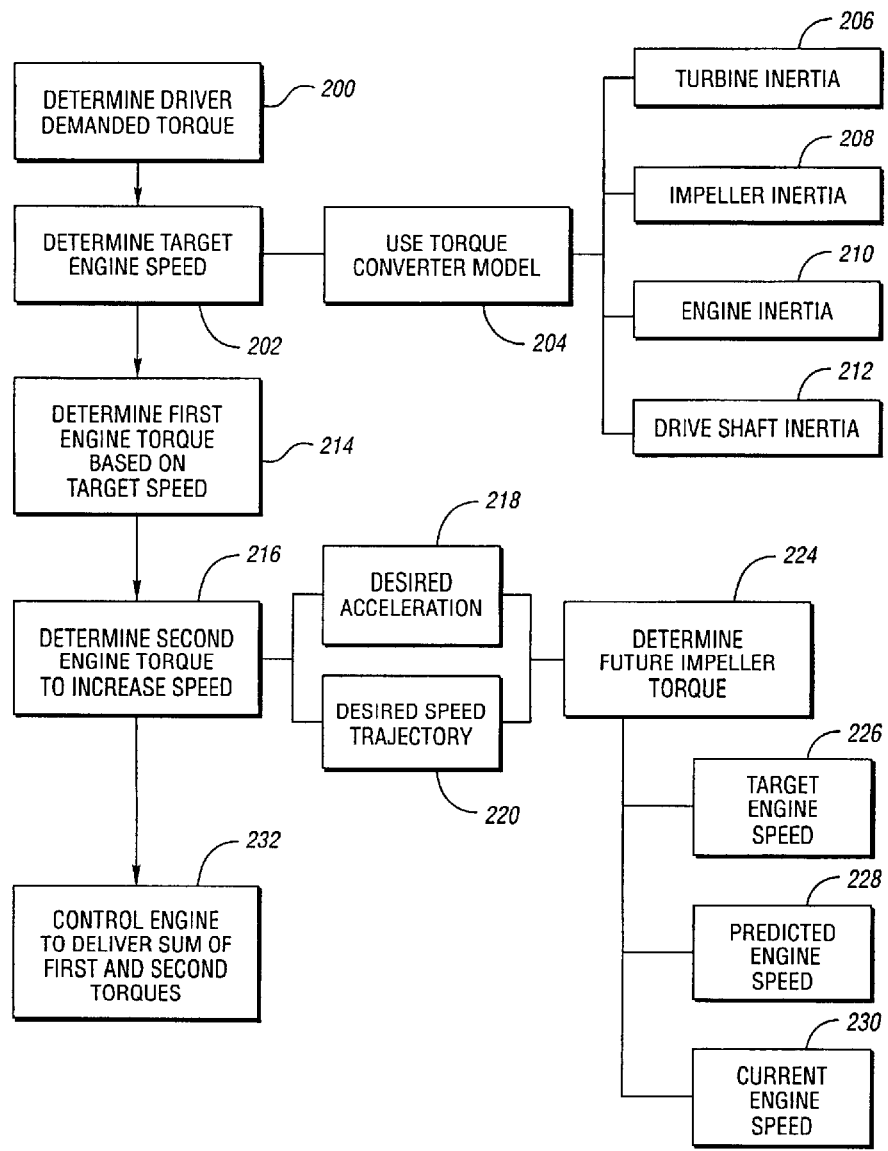
FIG. 2 is a flowchart illustrating operation of a system or method for determining engine torque based on a desired turbine torque according to one embodiment of the present invention.

Referring now to FIG. 2, a flowchart illustrating operation of one embodiment of a system or method for determining desired engine torque according to the present invention is shown. As will be appreciated by one of ordinary skill in the art, the flowchart illustrated in FIG. 2 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing as represented by the figures and in the claims is not necessarily required to achieve the objects, features, and advantages of the invention, but is provided for ease of illustration and description. Preferably, control logic as represented in FIG. 2 is implemented in software which is executed by a microprocessor-based controller. Of course, the control logic may be implemented in software, hardware, or a combination of software and hardware. While not explicitly illustrated, one of ordinary skill in the art will recognize that various steps may be performed iteratively.

Block 200 of FIG. 2 represents determination of a driver-demanded torque. In one embodiment, driver-demanded torque corresponds to a requested output shaft torque or wheel torque which is determined based on accelerator pedal position, vehicle speed, and barometric pressure. The driver-demanded torque may be determined using one or more lookup tables and/or equations stored in a computer readable storage medium in communication with the engine, powertrain, and/or vehicle controller. The driver-demanded torque is then used to determine a first engine torque corresponding to a first impeller input torque ($T_i$) at block 214 based on a steady-state torque converter model ($F_{Ne}$) 204 that uses the target engine speed represented by block 202 and described below and various other factors known to those of ordinary skill in the art, which may include currently selected transmission gear ratio, wheel size, and axle ratio, and account for various losses, such as transmission spin losses and torque proportional losses, for example (Blocks 206, 208, 210, and 212). The torque converter model ($F_{Ne}$) 204 may be derived from empirical data and is preferably represented by at least two equations corresponding to a two-part curve fit of the empirical data.

Block 202 determines a target engine speed $$N_e^{target}$$

to deliver the desired torque converter turbine torque $$T_t^{desired}$$

corresponding to the driver-demanded torque.

A second engine torque (corresponding to the acceleration torque term $$(I_e \dot{N}_e(t))$$

is determined to increase the engine speed from a current speed to the target engine speed as represented by block 216. The second engine torque may be determined to achieve a desired engine acceleration $$\dot{N}_e$$

218 or an engine speed trajectory 220 based on the current engine speed (Ne resulting in other than desired turbine torque) and the target engine speed $$N_e^{target}$$

determined in block 202, and is preferably clipped so that it is never less than zero.

In one embodiment, the desired engine acceleration is determined based on a current engine speed error $$(N_e^{target} - N_e)$$

and a proportional gain factor (ne_dot_mult) as represented by block 218. The proportional gain factor is preferably a calibrated value implemented as a function of the measured speed ratio $$\frac{N_t}{N_e}$$

as represented by block 218. The gain may be calibrated so that at very low speed ratios, the gain is a constant. For all speed ratios where transmission gear shifts are expected to occur, such as speed ratios of about 0.6 and above, the gain may be calibrated to zero, effectively eliminating the second engine torque. For a transition region (of about 0.3 to 0.6, for example), the gain value is preferably linearly interpolated between the low speed ratio value and zero. This limits the inertia compensation to launch of the vehicle.

When operating at higher speeds (and corresponding higher speed ratios), the first $$T_i(t) = T_{net}(t) - I_e \dot{N}_e(t)$$

where $T_i(t)$ is the impeller input torque as a function of time, $T_{net}(t)$ is the net torque available for acceleration as a function of time, $I_e$ is the rotating inertia as described above, and $$\dot{N}_e$$

is the engine rotational acceleration as a function of time. This acceleration torque term $$(I_e \dot{N}_e(t))$$

is accounted for in one embodiment of a system or method according to the present invention by calculating actual engine accelerations that result from the torque output of the engine and adjusting the estimated impeller input torque ($T_i(t)$).

A natural control law derived from the physical response of the engine and torque converter based on a throttle step command and corresponding engine speed trajectory may be represented by:

$$\dot{N}_e(t) \propto (N_e^{target} - N_e(t-L))$$

where the target engine/impeller speed $$N_e^{target}$$

is a function of turbine speed, desired turbine torque and the torque converter characteristics as represented by:

$$N_e^{target} = F_{Ne}(N_t, T_t^{desired})$$

and L represents a time delay in the system, in this example approximately 0.2 seconds. The term $$N_e^{target} - N_e(t-L)$$

corresponds to the engine speed error. The control law can then be used to produce a control algorithm as described below to determine a desired engine torque from desired turbine torque corresponding to the driver-demanded torque or wheel torque.

According to the present invention, a desired engine speed trajectory or engine acceleration can be determined based on the current engine speed and the target engine torque over-estimates the required engine torque. When driver demand first increases, the current value of the torque ratio across the converter ($T_t/T_i$) will be less than or equal to the value after the engine torque (and speed) increases. The speed ratio across the converter $$\frac{N_t}{N_e}$$

will be lower after the engine speed increases. As such, at the higher speed ratios, a desirable quick response is provided without requiring the second torque and the gain is set to zero for these speed ratios. This approach is also less dependent on an exact torque converter model.

In one embodiment, the second engine torque is based on a future torque converter impeller torque ($T_i(t+\Delta t)$) calculated using a current turbine speed ($N_t$) and a future engine speed $N_e(t+\Delta t)$ corresponding to the future impeller torque as represented by block 224. The future engine speed may be determined based on the target engine speed $$N_e^{target},$$

based on a predicted engine speed for the next engine revolution, or approximated using the current engine speed ($N_e$) as represented generally by blocks 226, 228, and 230, respectively.

Depending on the particular application, it may be desirable to modify the second torque to provide a derivative feedback term, which would help prevent overshoots. This provides a similar effect to using predicted values of turbine torque in that both start reducing the magnitude of the second torque before the engine speed reaches the target speed.

The engine is then controlled to deliver the sum of the first and second engine torques as represented by block 232.

As illustrated by the representative embodiment described in detail above, the present invention provides a controllable and responsive ETC powertrain under wheel torque control by accounting for inertia-based torque loads which occur during transient component rotation speed changes, particularly for vehicle launch and drive away.

While the best mode for carrying out the invention has been described in detail, those familiar with the art to which this invention relates will recognize various alternative designs and embodiments for practicing the invention as defined by the following claims.

What is claimed is:

1. A method for controlling a multiple cylinder internal combustion engine coupled to a transmission via a torque converter impeller selectively fluidly coupled to a torque converter turbine, the method comprising:
   determining a driver-demanded torque;
   determining a target engine speed to deliver a desired torque converter turbine torque corresponding to the driver-demanded torque;
   determining a first engine torque based on the target engine speed;
   determining a second engine torque to increase the engine speed from a current speed to the target engine speed; and
   controlling the engine to deliver the sum of the first and second engine torques.

2. The method of claim 1 wherein the step of determining a target engine speed comprises:
   determining the target engine speed based on a torque converter model.

3. The method of claim 1 wherein the step of determining a first engine torque comprises determining a steady-state engine brake torque required to maintain the target engine speed.

4. The method of claim 1 wherein the step of determining a second engine torque comprises determining the second engine torque based on a desired engine acceleration.

5. The method of claim 4 wherein the desired engine acceleration is determined based on a current engine speed error and a proportional gain factor.

6. The method of claim 1 wherein the step of determining a second engine torque comprises determining the second engine torque based on a desired engine speed trajectory.

7. The method of claim 1 wherein the step of determining a target engine speed comprises:
   determining the target engine speed based on a torque converter model derived from empirical data and represented by at least two equations corresponding to a two-part curve fit of the empirical data.

8. The method of claim 1 wherein the step of determining a second engine torque comprises determining a future torque converter impeller torque based on a current turbine speed and a future engine speed corresponding to the future impeller torque.

9. The method of claim 8 wherein the future torque converter impeller torque is determined according to:

$$T_i(t+\Delta t) = f_i\left(\frac{N_t}{N_e(t+\Delta t)}, N_e(t+\Delta t)\right)(N_e(t+\Delta t))^2$$

$$N_e(t+\Delta t) = N_e(t) + \Delta t \dot{N}_e(t)^{desired}.$$

10. The method of claim 8 wherein the future engine speed corresponds to the target engine speed.

11. The method of claim 8 wherein the future engine speed is a predicted engine speed for the next engine revolution.

12. The method of claim 8 wherein the future engine speed is approximated by using the current engine speed.

13. A method for controlling a multiple cylinder internal combustion engine coupled to a transmission via a torque converter having a torque converter impeller selectively fluidly coupled to a torque converter turbine, the method comprising:

determining a driver-demanded torque;

determining a first engine torque based on the driver demanded torque and a steady-state model of the torque converter;

determining a second engine torque based on a current engine speed and a target engine speed, wherein the second engine torque is based on a speed ratio of turbine speed and impeller speed; and controlling the engine to deliver the sum of the first and second engine torques.

14. The method of claim 13 wherein the step of determining a second engine torque comprises:

multiplying a difference between the current engine speed and the target engine speed by a gain factor that is a function of the speed ratio.

15. The method of claim 14 wherein the gain factor is zero.

16. The method of claim 14 wherein the gain factor is a constant.

17. The method of claim 14 wherein the gain factor is limited to values greater than or equal to zero.

18. The method of claim 14 wherein the step of determining a second engine torque comprises reducing the second engine torque based on a rate of change of the engine speed.

19. A system for controlling a multiple cylinder internal combustion engine coupled to a transmission via a torque converter having a torque converter impeller selectively fluidly coupled to a torque converter turbine, the system comprising:

an electronic controller in communication with at least the internal combustion engine and an accelerator pedal for determining a driver-demanded torque, the electronic controller determining a first engine torque based on the driver-demanded torque and a steady-state model of the torque converter, determining a second engine torque based on a current engine speed, a target engine speed, and a speed ratio of turbine speed and impeller speed, and controlling the engine to deliver the sum of the first and second engine torques.

20. The system of claim 19 wherein the electronic controller determines a second engine torque by multiplying a difference between the current engine speed and the target engine speed by a gain factor that is a function of the speed ratio.

21. The system of claim 20 wherein the gain factor is zero.

22. The system of claim 20 wherein the gain factor is a constant.

23. The system of claim 20 wherein the gain factor is limited to values greater than or equal to zero.

24. The system of claim 19 wherein the electronic controller determines a final second engine torque by reducing an initial second engine torque based on a rate of change of the engine speed.

25. A computer readable medium having stored data representing instructions executable by a computer to control a multiple cylinder internal combustion engine coupled to a transmission via a torque converter having a torque converter impeller selectively fluidly coupled to a torque converter turbine, the computer readable storage medium comprising:

instructions for determining a driver-demanded torque;

instructions for determining a first engine torque based on the driver-demanded torque and a steady-state model of the torque converter;

instructions for determining a second engine torque based on a current engine speed and a target engine speed, wherein the second engine torque is based on a speed ratio of turbine speed and impeller speed; and instructions for controlling the engine to deliver the sum of the first and second engine torques.

26. The computer readable storage medium of claim 25 wherein the instructions for determining a second engine torque comprise:

instructions for multiplying a difference between the current engine speed and the target engine speed by a gain factor that is a function of the speed ratio.

27. The computer readable storage medium of claim 26 wherein the gain factor is zero.

28. The computer readable storage medium of claim 26 wherein the gain factor is a constant.

29. The computer readable storage medium of claim 26 wherein the gain factor is limited to values greater than or equal to zero.

30. The computer readable storage medium of claim 25 wherein the instructions for determining a second engine torque comprise instructions for applying a feedback term to reduce overshoot.

* * * * *